(12) United States Patent
Binotto et al.

(10) Patent No.: US 12,401,660 B2
(45) Date of Patent: Aug. 26, 2025

(54) GEOGRAPHIC EDGE NODE DATA ACCESS CONTROL

(71) Applicant: International Business Machines Corporation, Armonk, NY (US)

(72) Inventors: Alecio Pedro Delazari Binotto, Munich (DE); Alexander Körner, Aschheim (DE); Dwarkanath Pralhad Rao, Dublin (IE); Mansura Habiba, Jhonstown (IE); Francisco Javier Garnica Alcazar, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 18/326,321

(22) Filed: May 31, 2023

(65) Prior Publication Data

US 2024/0406186 A1   Dec. 5, 2024

(51) Int. Cl.
  *H04L 9/40* (2022.01)
  *G06F 21/62* (2013.01)
(52) U.S. Cl.
  CPC ........ H04L 63/107 (2013.01); G06F 21/6218 (2013.01); H04L 63/20 (2013.01)
(58) Field of Classification Search
  CPC .... H04L 63/107; H04L 63/20; G06F 21/6218
  USPC .......................................................... 726/1
  See application file for complete search history.

(56) References Cited

U.S. PATENT DOCUMENTS

| | | | |
|---|---|---|---|
| 8,031,114 B2 | 10/2011 | Kellermeier | |
| 10,117,101 B2 | 10/2018 | Girdhar | |
| 10,158,615 B2 | 12/2018 | Broussard | |
| 10,209,363 B2 | 2/2019 | Ashoori | |
| 10,356,742 B2 | 7/2019 | Teller | |
| 11,271,944 B2 | 3/2022 | Patel | |
| 2018/0184232 A1* | 6/2018 | Maitra | .............. H04L 67/125 |
| 2020/0336472 A1 | 10/2020 | Drummond | |
| 2021/0006972 A1 | 1/2021 | Guim Bernat | |
| 2022/0137876 A1* | 5/2022 | Chung | ................ H04L 63/20 |
| | | | 711/154 |

OTHER PUBLICATIONS

Disclosed Anonymously,—"Dynamic Container Network Management in Edge Kubernetes Using Geofencing", An IP.com Prior Art Database Technical Disclosure, IP.com No. IPCOM000270019D, May 28, 2022, 7 Pgs.

* cited by examiner

*Primary Examiner* — Anthony D Brown
(74) *Attorney, Agent, or Firm* — Kelsey M. Skodje

(57) ABSTRACT

A method, computer program product, and computer system are provided for geographic edge node data access control. The method carried out at an edge node includes: obtaining a regulation control template for controlling access to data on an edge node for a new regulation region; and adjusting active regulation controls of a set of operation parameters of the edge node based on the regulation control template for the new regulation region. The method also includes: inferring an impact of the adjustment of active regulation controls, wherein the impact is a variation of the operation parameters of the edge node; and, when an impact is negative, further adjusting active regulation controls based on alterative rules in the regulation control template. The method verifies a validity of the adjustment of active regulation controls for the set of operation parameters of the edge node.

18 Claims, 6 Drawing Sheets

GEOGRAPHIC EDGE NODE DATA ACCESS CONTROL

BACKGROUND

The present invention relates to data protection, and more specifically, to geographic edge node data access control.

Edge computing is a distributed information technology architecture in which client data is processed at the periphery of the network as close to an originating source as possible. Edge nodes include edge devices, edge cluster, edge clouds, etc. Usually, the range would be within the range for common cell tower for public edge nodes. However, if the edge nodes are private, they usual range would be the range of the local network, for example the range of the Wi-Fi connectivity. For purposes of this document, "edge computing"/"edge device" is defined as any computer device that is: (i) in direct data communication with its originating source(s), such as through a direct wireless connection; or (ii) can communicate with its originating source(s) through no more than one intermediate network communication device (for example, one cell tower or one Wi-Fi router).

For countries with regulatory data handling constraints, there is currently a need to apply costly country-specific customizations before or after the deployment of an edge node in the country to restrict access to data stored on the edge nodes.

Edge nodes may be physically mobile. For example, edge nodes may be, for example, manned vehicles, unmanned vehicles, outposts and small computing units, mobile 5G edge nodes to enhance coverage, etc.

Geography-based regulated controls applied to edge nodes during its lifecycle need to change as the edge node is moved across geographic regions with different regulations. The regulated controls protect the data stored locally on an edge node.

SUMMARY

According to an embodiment of the present invention there is provided a computer-implemented method for geographic edge node data access control, said method carried out at an edge node and comprising: obtaining a regulation control template for controlling access to data on an edge node for a new regulation region; adjusting active regulation controls of a set of operation parameters of the edge node based on the regulation control template for the new regulation region; inferring an impact of the adjustment of active regulation controls, wherein the impact is a variation of the operation parameters of the edge node; when an impact is negative, further adjusting active regulation controls based on alterative rules in the regulation control template; and verifying a validity of the adjustment of active regulation controls for the set of operation parameters of the edge node.

According to another embodiment of the present invention there is provided a computer-implemented method for geographic edge node data access control, said method carried out at a server and comprising: collecting regulation control data from external sources for a region and extracting metadata; generating a regulation control template for access to data on an edge node for a regulation region, wherein the regulation control template includes alternative sets of regulation control rules for edge nodes; and verifying a validity of an adjustment of active regulation controls for a set of operation parameters at an edge node for a region.

According to another embodiment of the present invention there is provided a system for geographic edge node data access control, comprising: a processor and a memory configured to provide computer program instructions to the processor to execute the function of the components at an edge node including: a template obtaining component for obtaining a regulation control template for controlling access to data on an edge node for a new regulation region; an adjusting component for adjusting active regulation controls of a set of operation parameters of the edge node based on the regulation control template for the new regulation region including a set of alternative rules; an impact component for inferring an impact of the adjustment of active regulation controls, wherein the impact is a variation of the operation parameters of the edge node; and a verifying component for verifying a validity of the adjustment of active regulation controls for the set of operation parameters of the edge node.

According to another embodiment of the present invention there is provided a system for geographic edge node data access control, comprising: a processor and a memory configured to provide computer program instructions to the processor to execute the function of the components at a server including: a metadata creation component for collecting regulation control data from external sources for a region and extracting metadata; a regulation control template component for generating a regulation control template for access to data on an edge node for a regulation region, wherein the regulation control template includes alternative sets of regulation control rules for edge nodes; and a change manager component for verifying a validity of an adjustment of active regulation controls for a set of operation parameters at an edge node for a region.

According to another embodiment of the present invention there is provided a computer program product for geographic edge node data access control, the computer program product comprising a computer readable storage medium having program instructions embodied therewith, the program instructions executable by a processor to cause the processor to: obtain a regulation control template for controlling access to data on an edge node for a new regulation region; adjust active regulation controls of a set of operation parameters of the edge node based on the regulation control template for the new regulation region; infer an impact of the adjustment of active regulation controls, wherein the impact is a variation of the operation parameters of the edge node; when an impact is negative, further adjust active regulation controls based on alterative rules in the regulation control template; and verify a validity of the adjustment of active regulation controls for the set of operation parameters of the edge node.

According to another embodiment of the present invention there is provided a computer program product for geographic edge node data access control, the computer program product comprising a computer readable storage medium having program instructions embodied therewith, the program instructions executable by a processor to cause the processor to: collect regulation control data from external sources for a region and extracting metadata; generate a regulation control template for access to data on an edge node for a regulation region, wherein the regulation control template includes alternative sets of regulation control rules for edge nodes; and verify a validity of an adjustment of active regulation controls for a set of operation parameters at an edge node for a region.

The computer readable storage medium may be a non-transitory computer readable storage medium and the computer readable program code may be executable by a processing circuit.

BRIEF DESCRIPTION OF THE DRAWINGS

Embodiments of the present invention will now be described by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, a system, and a computer program product are provided for geographic edge node data access control.

Data protection is an improvement in the technical field of computer security generally. This is applied in the technical field of controlling access to data at an edge node.

There are different regulatory requirements for edge nodes based on their geographic location. The described method detects a change in location of an edge node to a new regulatory region and determines the associated regulatory controls required for policies for that particular region. The method provides automatic, regulatory compliant protection of data stored on an edge node based on its physical location. The method may also determine a location of an accessor of the data at the edge node to comply with regulations or policies. The regulatory compliant protection is achieved by dynamically adjusting the active regulatory controls of the edge node when it is being relocated to a different geographic regulatory region.

Selection of regulatory controls at an edge node requires optimization based on the different operation parameters available in the edge environment of the particular edge node. Therefore, a robust method is required to select the optimal set of regulatory controls by adjustment of the controls.

The method infers the impact of adjustments to the regulatory controls and may include a process for self-healing in the case of negative impact. A method to self-heal by applying an alternative adjustment of regulatory controls is described in order to undo any negative impact of the adjustment.

Once the adjusted regulatory controls are applied, the feasibility of the environment may be validated and verified based on different operation parameters.

The method leverages a geographic location edge based awareness service, intelligent workflow, and natural language processing for the implementation method.

Figure 1:
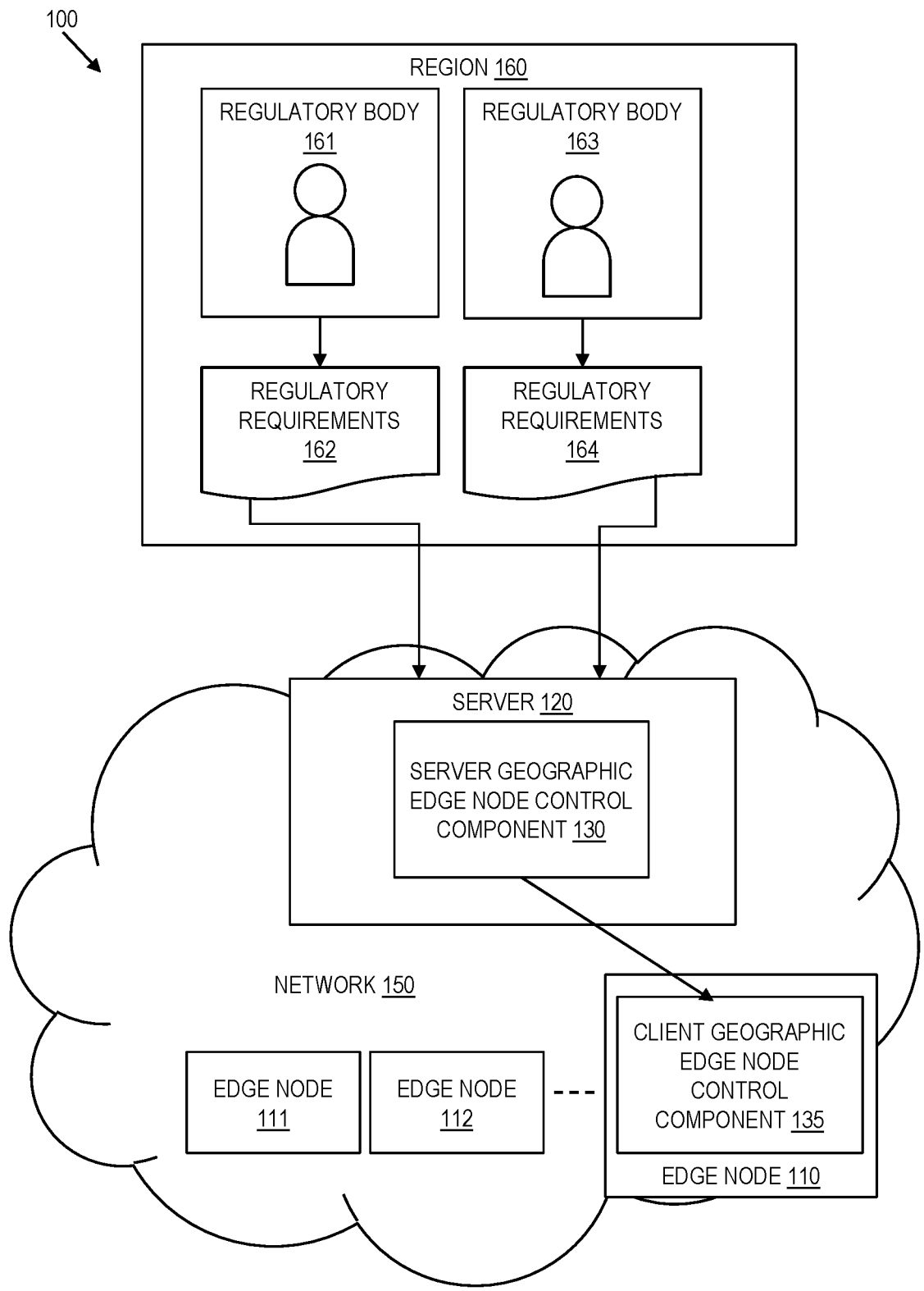
FIG. 1 is a block diagram of illustrating an example embodiment of an overview of a system in accordance with embodiments of the present invention.

Referring to FIG. 1, a block diagram 100 shows an example embodiment of an environment for geographic edge node data access control.

A geographic region 160 may have multiple regulatory bodies 161, 163 that define regulatory data handling and data access requirements 162, 164. This may relate to who can access data and from where as well as how data is stored and accessed.

Edge computing environments bring computation and data storage closer to the sources of data and may include edge nodes 110, 111, 112 that may be in the form of edge devices, edge cluster, edge clouds, etc. Edge nodes may be physically mobile and therefore the region 160 in which they are based may change. Edge nodes may be, for example, smart watches, phones, unmanned aerial vehicles, robots, or even bigger nodes for data centers that are mobile.

The described method and system provide geographic edge node control in which access to data at an edge node 110, 111, 112 is enforced by secure application programming interfaces (APIs). The secure APIs are capable of verifying the physical location of the requesting accessor (application, machine, person, etc.). The secure APIs can be integrated with local (distributed) or global metadata repositories.

The described method and system are provided by a server 120 and edge nodes 110, 111, 112 in a networked environment 150. A server geographic edge node control component 130 is provided at a server 120 for assimilating regulatory requirements 162, 164 for different regions 160 to produce a regulation control template of rules for edge nodes 110, 111, 112 to apply via the secure API when they are in a region. A client geographic edge node control component 135 is provided at an edge node 110 for accessing the regulation control template and adjusting active regulation controls at the edge node 110 when applying the secure API. The template is a set of suggested attribute values. In some embodiments of the present invention, the template is a key-value schema structure that contains certain value for certain keys in order to generate a decision automatically. Some embodiments of the present invention include at least attribute values for the following attributes: (i) geo location for applicable regulatory bodies; (ii) multiple policy definition that needs to follow by the edge device; and (iii) controls or settings that needs to apply for those policies on the device.

The client geographic edge node control component 135 includes functionality to determine an impact of the adjusted regulation controls on the operational parameters of the edge node 110 to ensure that these are not negatively impacted. The server 120 provides the secure application programming interface (API) for the edge nodes 110, 111, 112 to enforce and control the access to the data based on the adjusted active regulation controls.

When the edge nodes move from one region to another, the movement is detected. The edge nodes may be any device with minimal computational power and mobility. Previous region configurations on the edge node are stopped and new region regulations are accessed and dynamically configured at the edge node with new rules that represent the new region regulations. The edge node is deployed for use in the new region with current regulation controls. The movement is continually monitored to detect the current region.

Figure 2:
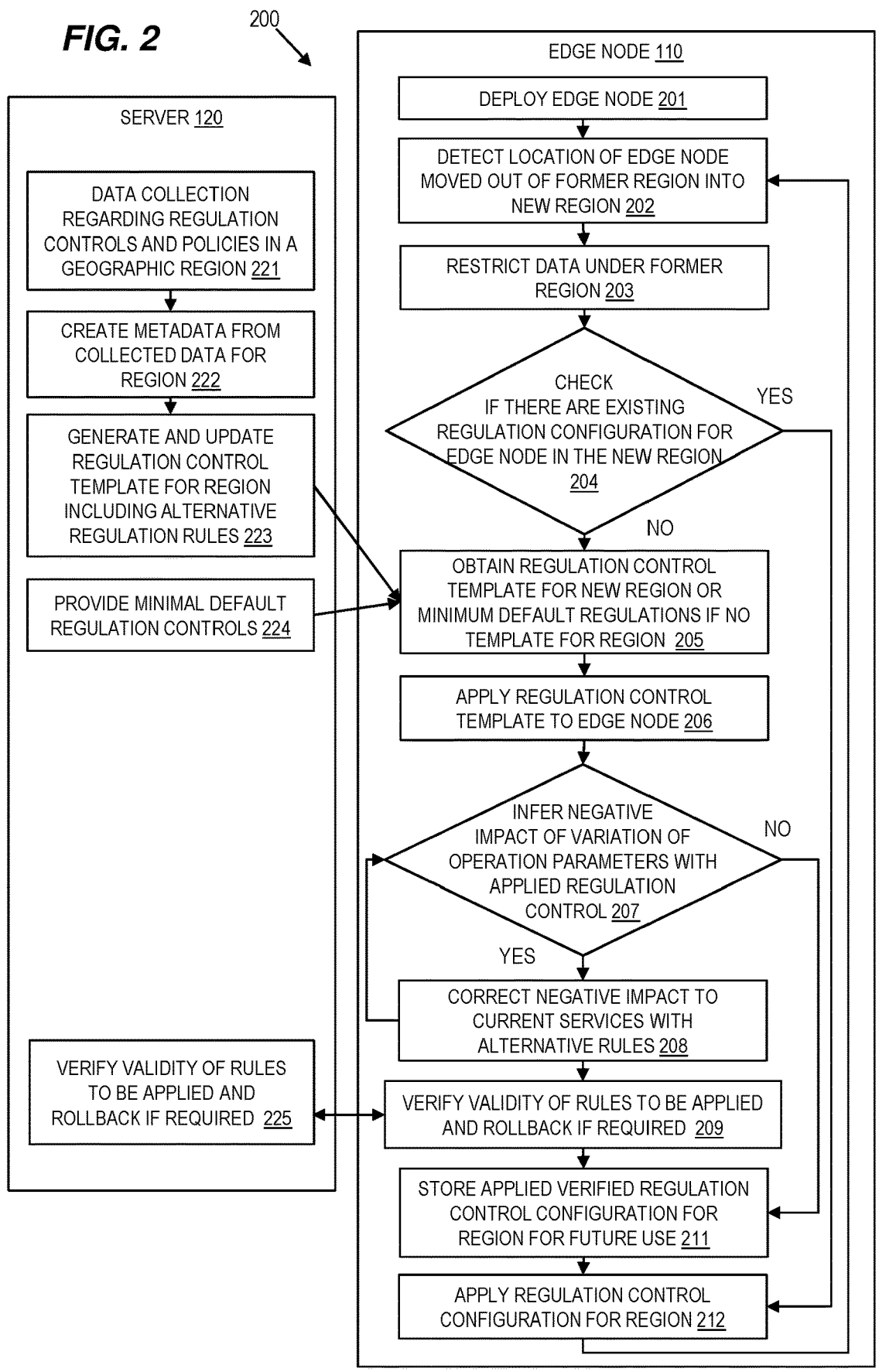
FIG. 2 is a flow diagram of an example embodiment of a method in accordance with embodiments of the present invention.

Referring to FIG. 2, a flow diagram 200 shows an example embodiment of a method for geographic edge node data access control. The flow diagram 200 shows method steps that may be carried out at a server 120 and method steps that may be carried out at an edge node 110.

At the server 120, the method may collect 221 data regarding regulatory policies, rules, controls, and deployment patterns for a regulatory region (for example, a country). This data may be published by a regulatory body of the region in public web pages or repositories. This data may be accessed from local distributed or global metadata repositories. The server 120 may crawl external web pages and systems for a region. The method may create or extract 222 metadata from the collected data for a region.

At the server 120, the method may use an intelligent workflow to use the metadata and generate 223 (and keep updated) a regulation control template for edge nodes in the region. The regulation control template may include levels of configurations and rules for adjusting active regulation controls in an edge node, including primary rules, alternative rules, etc. The regulation control template may be generated and updated by inferring controls from the regulatory policies, rules, controls, and deployment patterns based on the metadata of the collected data. The regulatory controls are configurations and/or rules provided in a template to apply data access restrictions at an edge node. In this way, the method may integrate with a local distributed or central metadata repositories in order to provide the necessary data governance integration.

For example, when the regulations are made publicly available by Governments in their web pages or reachable through APIs, a server based solution may process the regulations and create controls and rules.

The method at an edge node 110 may deploy 201 the edge node including functionality to control access to data at the edge node based on the regulatory requirements of a geographic region in which the edge node is located.

The method may detect 202 the crossing of a geographic regulatory boundary by the edge node. A location of the edge node is detected as it is moved out of a former regulatory region into a new regulatory region. The edge node may be equipped with a tamper-proof hardware or software solution which provides its physical location in a granularity so that the edge node can be easily located within a geographic boundary which requires regulatory compliant management of data stored on that edge node, the location identification solution may be, for example, based on Internet Protocol (IP), Global Positioning System (GPS), or service provider location identification. The change in location to a new regulatory region may act as an event to trigger a change in regulation controls at the edge device.

The method may restrict 203 access to data at the edge node provided for a previous regulatory region. This may guarantee that the access to data of a former regulatory region will be either non-accessible (for example, deleted or encrypted) or only accessible based on limited regulatory control rules of the former region.

The method may check 204 if an existing pre-validated regulation control configuration is known for the edge node for the new regulation region. This may be the case when an edge node has previously been located in the new regulatory region. It may be verified if the existing pre-validated regulation control configuration is still current.

If there is an existing pre-validated regulation control configuration, the method may apply the existing pre-validated regulation control configuration. The edge node may automatically apply the required regulatory controls which come pre-validated for multiple regions on the edge node or could be dynamically retrieved given the region the edge node "entered".

If there is not an existing pre-validated regulation control configuration for the edge node for the new region, the method may obtain 205 a regulation control template from the server 120 for controlling access to data on an edge node 110 for a new regulation region. If there is no template for the region provided by the server 120, the server 120 may provide 224 a minimal set of default regulation controls to be applied by the edge node 110.

The edge node may apply 206 the regulation control template that adjusts active regulation controls of a set of operation parameters of the edge node 110 to comply with the regulation controls for the new regulation region. The regulation control template may include different sets of rules to provide alternative rules, if required.

The method may infer 207 any negative impact of the adjustment of active regulation controls of the edge node. The impact may be a variation to current services of operation parameters of the edge node 110. A negative impact of the adjustment may be corrected 208 by applying alternative rules from the template. For example, there are several controls that may be applied to comply with the European Union's General Data Protection Regulation (GDPR).

If the impact assessment indicates degrading performance, then exceptions may be used that still comply with the GDPR regulation. For example, an exception could be: replacing an encryption algorithm that has low performance on a less powerful edge node by one that is more suitable for that kind of less powerful edge node, but still fulfils the regulatory requirements.

The method may verify 209 a validity of the adjustment of active regulation controls for a set of operation parameters of the edge node 110 by the server 225. When the adjustment of active regulation controls is not valid for a set of operation parameters, one or more of the operation parameters at the edge node may be changed. When the adjustment of active regulation controls is not valid for a set of operation parameters, the method may roll back the adjustment of active regulation controls of the edge node 110.

In this way, the method adjusts active regulation controls at the edge node 110 dynamically in real time as a change of location of an edge node to a new regulatory region is detected.

The method may store 211 a regulation control configuration for the new regulation region once the validity of the adjustment is verified. The method may apply 212 the regulation control configuration for the new region and then loop to continue detecting a further change of location to a different regulatory region.

The access to data at an edge node 110 is enforced by the secure APIs using the described method. The secure APIs may verify the physical location of a requesting accessor (application, machine, person, etc.) and may apply the access control in the context of the current location region of the edge node 110.

As part of activating the correct regulatory controls, tamper proof data access APIs may be provided in order to enforce the regulatory compliant access to the edge node's data. Any other access to the local data may be prohibited.

The described method dynamically generates, applies, and enforces geo-location-aware regulatory controls to protect the data stored locally on an edge node. The regulatory controls may be dynamically generated allowing real time update of regulatory controls in the edge node. The described method significantly reduces regulatory control deployment time and effort.

The method may apply event driven monitoring for violation or change in controls. The detection of a change of regulatory region acts as an event to trigger a change in regulation controls.

The method may be implemented as a data centric commercial off-the-shelf edge node appliance, which may be sold and shipped to any country with regulatory data handling constraints without the need to apply costly country specific customizations before or after the deployment. In this way, a plug and play out-of-the-box regulatory compliance may be provided for any edge node equipped with the capability. In cloud-based data centric edge nodes, the method may be implemented for building regional clouds and edge clouds.

The regulation controls are not fixed for each geographic location due to on the dynamic and uncertain behavior of form, operation parameters, and model of the device that is the edge node. Therefore, the method provides a regulation control template for a region to an edge node that applies and adjusts it to suit their device and environment.

The method infers the impact of variation of operation parameters due to the regulation adjustment. As the regulation controls at the edge node are adjusted based on the change in region, the methods assess the corresponding impact. A negative impact is addressed by adjusting based on alternative rules in the regulation control template. The method may also verify a validity of rules to be applied with a corresponding rollback feature in the case of failed validation.

The method may readjust the template based on a new regulatory policy as the policy dynamically changes. A changed policy may be validated to ensure that the changed policy is valid for all operation parameters, otherwise the parameters may to be changed.

Figure 3:
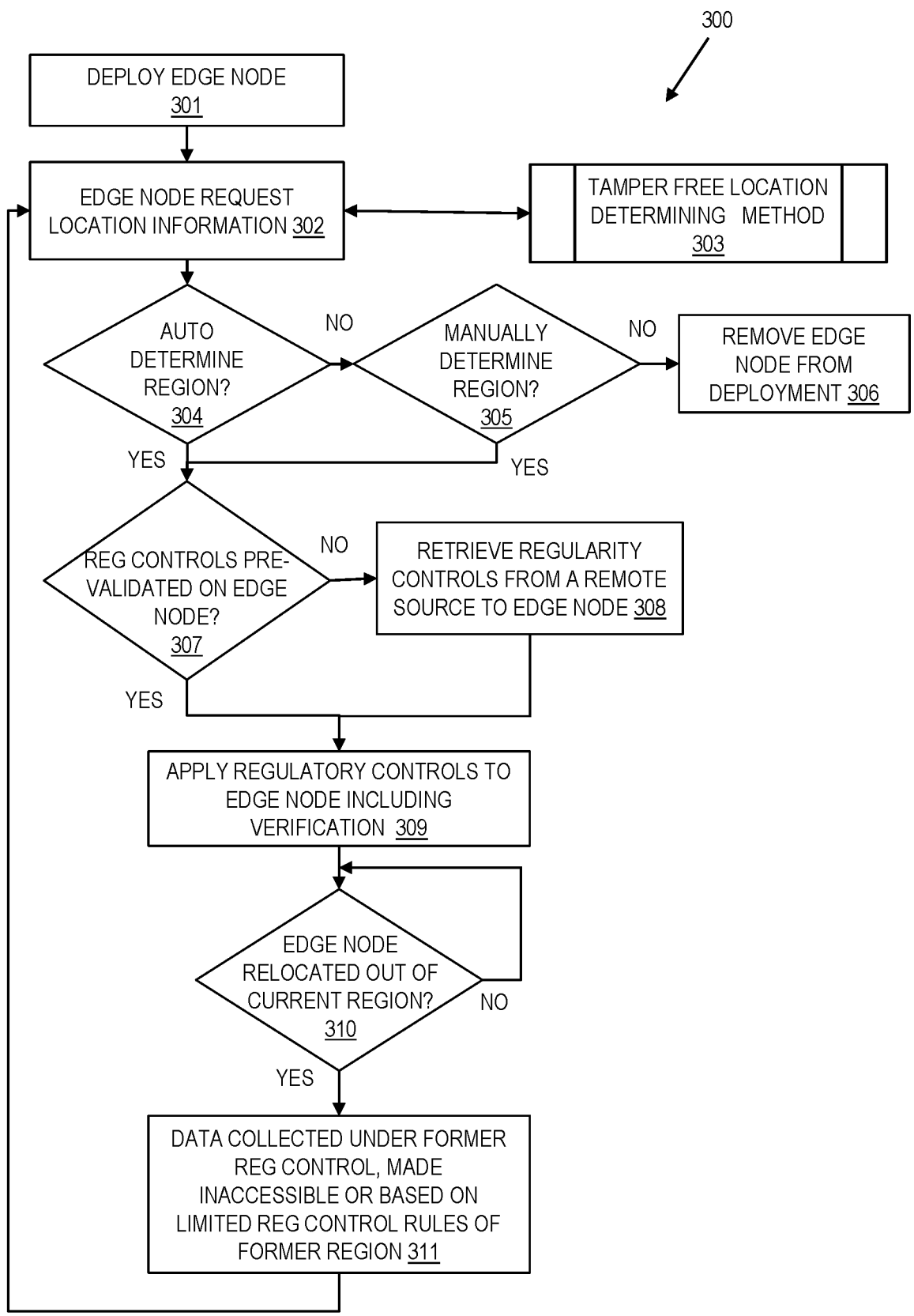
FIG. 3 is a flow diagram of another example embodiment of a method in accordance with embodiments of the present invention.

Referring to FIG. 3, a flow diagram 300 shows another example embodiment of the described method as carried out at an edge node.

The edge node may be deployed 301 and the edge node may request 302 location information from a tamper free location determining method 303. The method may automatically determine 304 the regulation region or may manually determine 305 the region, if automatic determination is not possible. If region determination is not possible, the edge node may be removed 306 from deployment.

It may be determined 307 if regulation controls are pre-validated on the edge node. If not, the edge node may retrieve 308 regulation controls from a remote source. The regulation controls may be applied 309 to the edge node including verification.

It may later be determined 310 that the edge node is relocated out of the current region in which case, the data collected under the former regulation control may be made 311 inaccessible or subject to limited regulation control rules of the former region.

Further example embodiments are now described. The described method may dynamically gather country specific policies based on an identified location and dynamically apply regulatory controls to the edge node based on the policies when the edge node moves to a different location. The regulatory controls are configured on the edge node and not hybrid or cloud.

In one example, the regulations may relate to data processing policies for regions such as countries or groups of countries (such as the European Union). The regulation controls for edge nodes may include configurations of the edge node sensors. If an edge node has a camera, and the edge node enters a region with the General Data Protection Regulation (GDPR) privacy policy, faces on camera sensors may be blurred to meet the policy.

The identification of a change of regulatory region may require a change in a corresponding regulatory policy. For example, the edge node may be a health-class wearable device and the health regulatory in a first region may be different from health regulatory in a second region. When the health wearable is moved from the first region to the second region due to a user moving with the wearable, the health wearable uses an immediate location identification and dynamically applies the health data regulation policy to this moving edge node. This may also apply to an edge health data processing node that is relocated to a different physical location.

When an edge device such as satellite node, unmanned aerial vehicle, car, plane, or cloud native edge nodes (for example, web services outposts) moves its location from one place to another, the physical location is no longer fixed, and it changes within a very short time. Therefore, the method utilizes a fast location detection mechanism and based on the changed location, a new set of regulatory controls is dynamically applied on the moving dynamic edge node.

The described method generates 1 to n regulatory controls for the edge node based on different dynamic regulatory controls in different regions. The method applies those controls to the edge node and verifies the impact of the new or changed or reconfigured controls. In the case of inefficient controls, the method also finds alternative controls to comply with the new or changed regulation policy.

Figure 4:
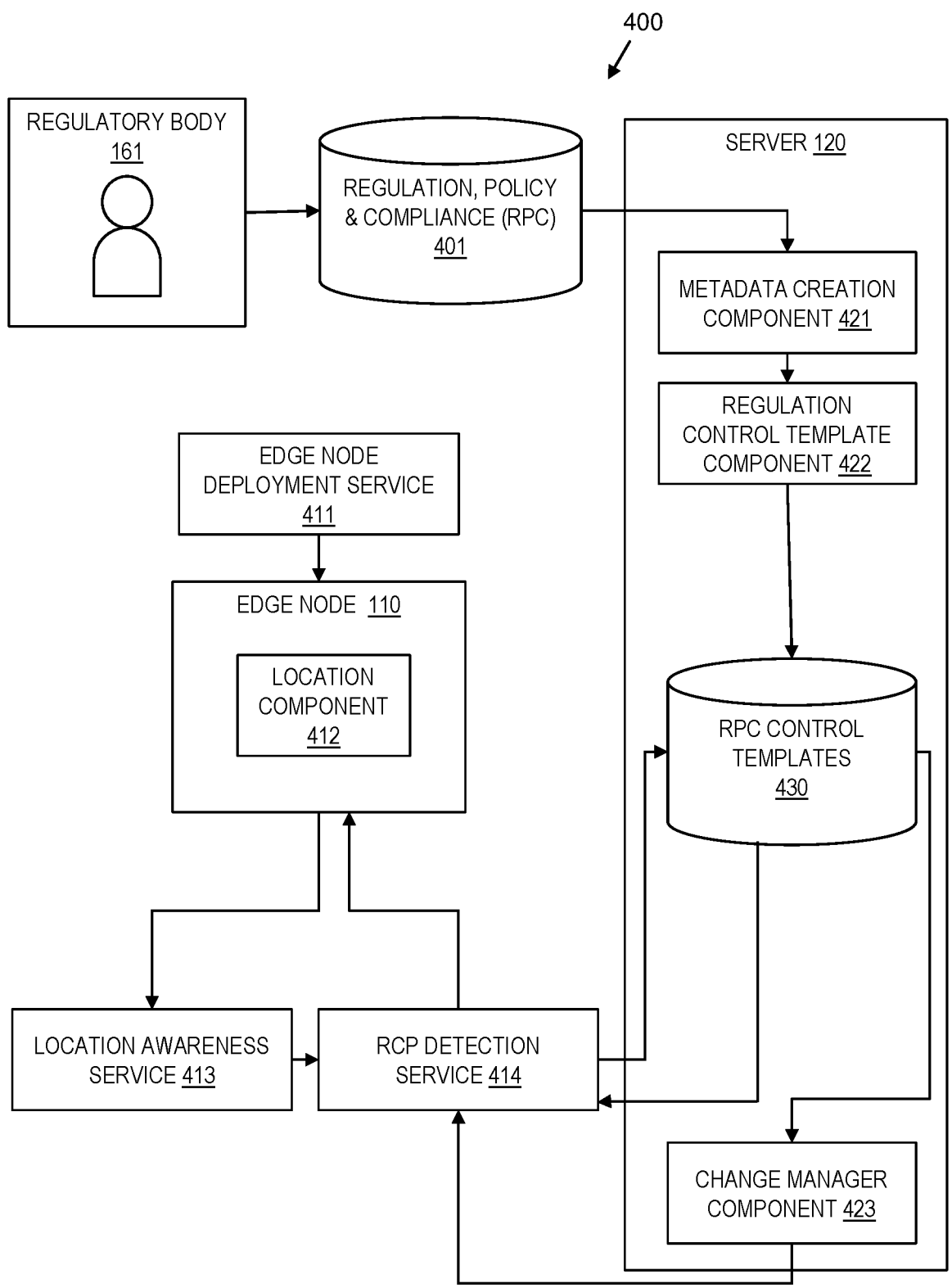
FIG. 4 is a block diagram of an example embodiment of a system in accordance with embodiments of the present invention.

Referring to FIG. 4, a block diagram 400 illustrates the flow through an environment of the described system.

A regulatory body 161 may publish regulation, policy, and compliance (RPC) data 401 for a region through public web pages or repositories. The server 120 may include a metadata creation component 421 for collecting RPC data from the published external sources for a region and extracting metadata.

A regulation control template component 422 may be provided for generating a regulation control template for access to data on an edge node for a regulation region. The regulation control template may include alternative sets of regulation control rules for edge nodes. The regulation control template component 422 may be intelligent workflow component, for example, using CRUD (Create, Read, Update, and Delete), for creating an RPC control template 430 for the region which may be stored remotely with templates for other regions. The server 120 may also include a change manager component 423 for managing and verifying a change of controls at an edge node 110. This may include verifying a validity of an adjustment of active regulation controls for a set of operation parameters at an edge node for a region.

The edge node 110 may use an edge node deployment service 411 for deploying the edge node 110 and may have a tamper-proof location component 412 to determine the current location of the edge node 110.

The current location (or change in location) may be input to a location awareness service 413 to determine a change in regulation region and may trigger an RCP detection service 414 that queries the appropriate RPC control template 430 from the remote storage. The RPC detection service 414 may determine the rules and policies with a least negative or no negative impact.

Figure 5:
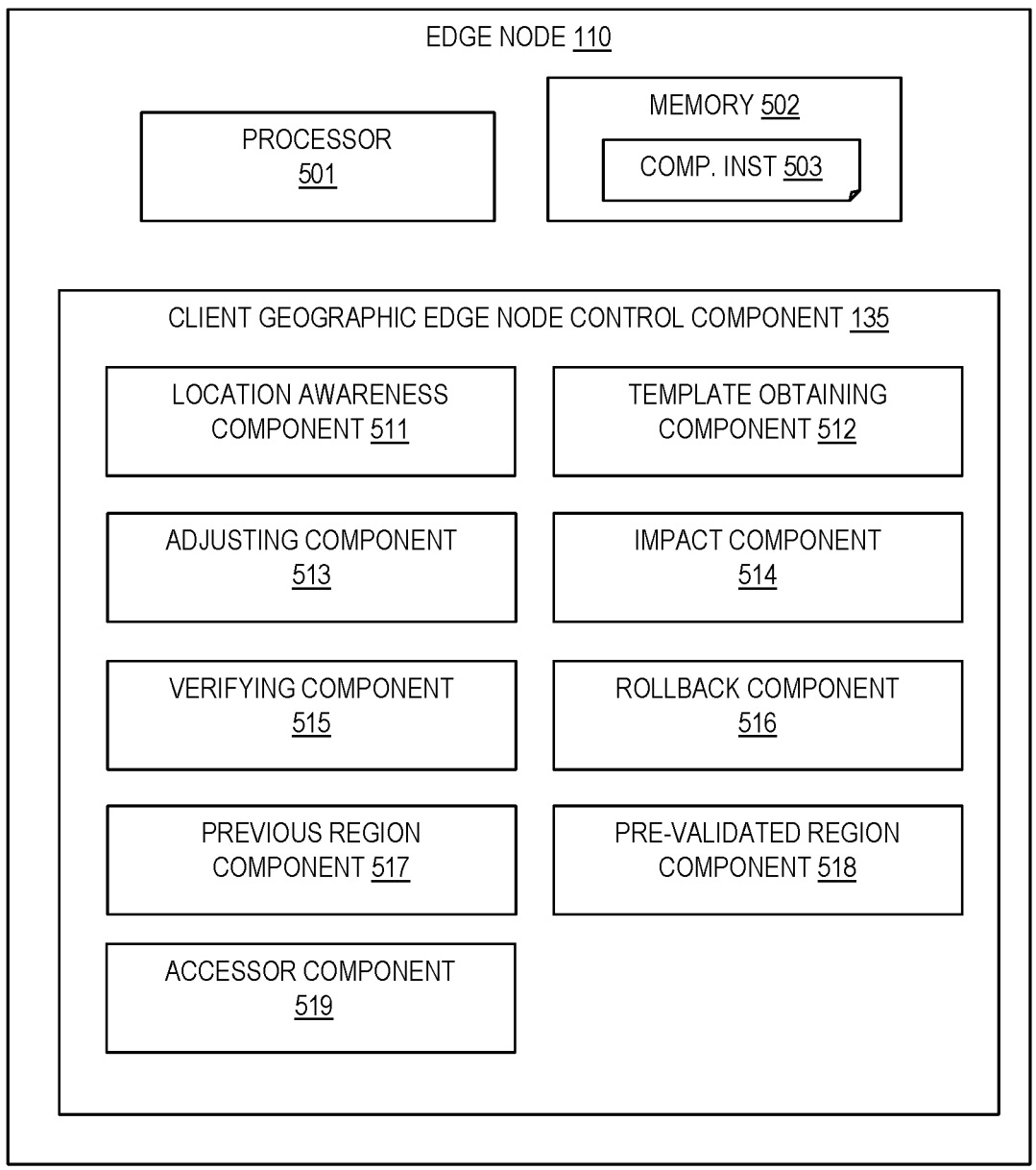
FIG. 5 is block diagram of an example embodiment of an edge node in accordance with embodiments of the present invention.

The change manager component 423 may listen to the request for the RCP control template and may update the change at the RCP detection service 414. The method may apply the retrieved RCP controls at the edge node 110 using the template. The change manager component 423 may act as a validator that detects the change in impact and selects alternative RPC rules and applies these rules to reduce the impact of the policy on the edge node Referring to FIG. 5, a block diagram shows an edge node 110 that may be a computing system that includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the client geographic edge node control component 135 described herein including the following components.

The client geographic edge node control component 135 may include a location awareness component 511 for determining a change in location of the edge node 110 to a new regulation region using a real time tamper-proof location component at the edge node 110. The location awareness component 511 may use the location awareness service 413 of FIG. 4.

The client geographic edge node control component 135 may include a template obtaining component 512 for obtaining a regulation control template for controlling access to data on an edge node for a new regulation region. The template obtaining component 512 may use the RCP service 414 of FIG. 4.

The client geographic edge node control component 135 may include an adjusting component 513 for adjusting active regulation controls of a set of operation parameters of the edge node 110 based on the regulation control template for the new regulation region. The client geographic edge node control component 135 may include an impact component 514 for inferring an impact of the adjustment of active regulation controls, where the impact is a variation of the operation parameters of the edge node. The adjusting component 513 may include adjusting to a set of alternative rules, if required due to a negative impact of an adjustment.

The client geographic edge node control component 135 may include a verifying component 515 for verifying a validity of the adjustment of active regulation controls for the set of operation parameters of the edge node. This works in conjunction with the change manager component 423 of the server 120 of FIG. 4. The client geographic edge node control component 135 may include a rollback component 516 for, when the adjustment of active regulation controls is not valid for the set of operation parameters, rolling back the adjustment of active regulation controls of the edge node.

The client geographic edge node control component 135 may include a previous region component 517 for restricting access to data at the edge node provided for a previous regulatory region.

The client geographic edge node control component 135 may include a pre-validated region component 518 for determining if an existing pre-validated regulation control configuration is known for the edge node for a regulation region and applying the existing pre-validated regulation control configuration instead of adjusting the active regulation controls.

The client geographic edge node control component 135 may include an accessor component 519 for identifying the physical location of a data requesting accessor and applying the active regulation controls.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
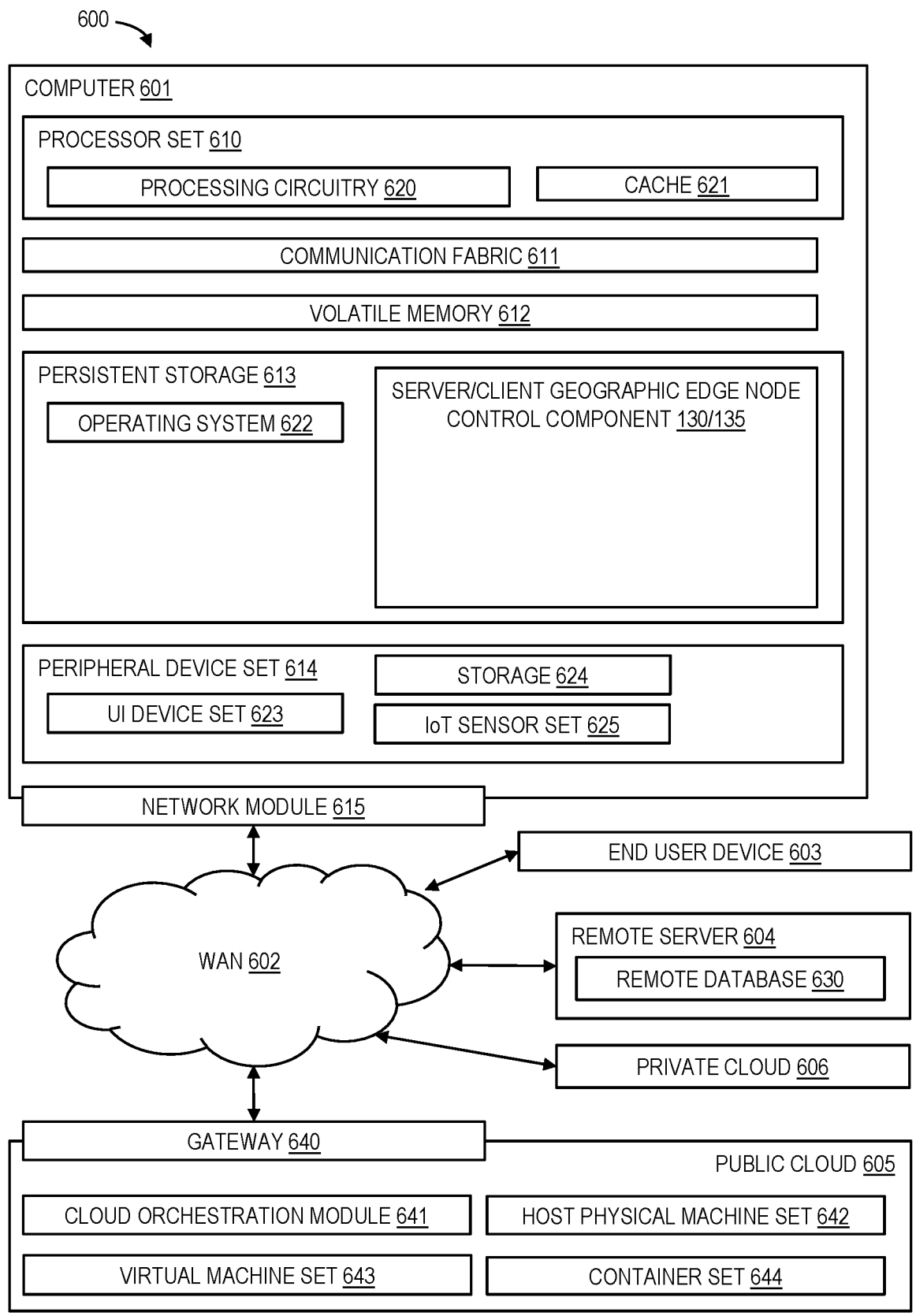
FIG. 6 is a block diagram of an example embodiment of a computing environment for the execution of at least some of the computer code involved in performing the present invention.

Referring to FIG. 6, computing environment 600 contains an example of an environment for the execution of at least some of the computer code involved in performing the inventive methods, such as a server/client geographic edge node control component 130/135. In addition to component 130/135, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and component 130/135, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in component 130/135 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in component 130/135 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Set of thing(s): does not include the null set; "set of thing(s)" means that there exist at least one of the thing, and possibly more; for example, a set of computer(s) means at least one computer and possibly more.

What is claimed is:

1. A method comprising:
receiving a definition of a new regulation region that will include an edge node, which is subject to data access control;
obtaining a regulation control template including: (i) a plurality of suggested attribute values for controlling access to data on the edge node when the edge node is used in the new regulation region, and (ii) a plurality of alternative rules;
adjusting active regulation controls of a set of operation parameters of the edge node using the plurality of suggested attribute values of the regulation control template;
determining that there has occurred a negative impact of the adjusting the active regulation controls, the negative impact being a variation in at least one operation parameter of the set of operation parameters of the edge node;
responsive to the determination of the negative impact, further adjusting the active regulation controls by applying the plurality of alternative rules in the regulation control template; and
verifying a validity of the further adjustment of the active regulation controls for the set of operation parameters of the edge node.

2. The method of claim 1, further comprising:
in response to determining, based on the verifying, that the further adjustment of the active regulation controls is not valid for the set of operation parameters, changing one or more of the operation parameters.

3. The method of claim 1, further comprising:
in response to determining, based on the verifying, that the further adjustment of the active regulation controls is not valid for the set of operation parameters, rolling back the further adjustment.

4. The method of claim 1, further comprising:
determining a change in location of the edge node from the new regulation region to an updated regulation region using a real time tamper-proof location detection method.

5. The method of claim 4, further comprising:
responsive to the determination of the change in location of the edge node to the updated regulation region, automatically adjusting the active regulation controls of the edge node.

6. The method of claim 1, wherein the plurality of suggested attribute values comprise:
a location for applicable regulatory bodies;
a definition of a plurality of policies that need to be followed by the edge node; and
controls that need to be applied to implement the plurality of policies on the edge node.

7. A computer program product, the computer program product comprising a computer readable storage medium having program instructions embodied therewith, the program instructions executable by a processor to cause a device to perform a method, the method comprising:
receiving a definition of a new regulation region that will include a first node, which is subject to data access control;
obtaining a regulation control template comprising:
a plurality of suggested attribute values for controlling access to data on the first node when used in the new regulation region; and
a plurality of alternative rules;
adjusting active regulation controls of a set of operation parameters of the first node using the plurality of suggested attribute values of the regulation control template;
determining that there has occurred a negative impact of the adjusting the active regulation controls, the negative impact being a variation in at least one operational parameter of the set of operation parameters of the first node;
responsive to the determination of the negative impact, further adjusting the active regulation controls by applying the plurality of alternative rules in the regulation control template; and
verifying a validity of the further adjustment of the active regulation controls for the set of operation parameters of the first node.

8. The computer program product of claim 7, wherein the method further comprises:
in response to determining, based on the verifying, that the adjustment of the active regulation controls is not valid for the set of operation parameters, changing one or more of the operation parameters.

9. The computer program product of claim 7 wherein the first node operates as an edge node when operating in the new regulation region.

10. The computer program product of claim 9, wherein the method further comprises:
determining a change in location of the first node from the new regulation region to an updated regulation region using a real time tamper-proof location detection method.

11. The computer program product of claim 10, wherein the method further comprises:
responsive to the determination of the change in location of the first node to the updated regulation region, automatically adjusting the active regulation controls of the first node.

12. The computer program product of claim 7 wherein the plurality of suggested attribute values comprise:
a location for applicable regulatory bodies;
a definition of a plurality of policies that need to be followed by the first node; and controls that need to be applied to implement the plurality of policies on the first node.

13. A computer system comprising:
a processor;
and
a memory in communication with the processor, the memory containing program instructions that, when executed by the processor, are configured to cause the processor to perform a method, the method comprising:
   receiving a definition of a new regulation region that will include a first node, which is subject to data access control;
   obtaining a regulation control template comprising:
      a plurality of suggested attribute values for controlling access to data on the first node when used in the new regulation region; and
      a plurality of alternative rules;
   adjusting active regulation controls of a set of operation parameters of the first node using the plurality of suggested attribute values of the regulation control template;
   determining that there has occurred a negative impact of the adjusting the active regulation controls, with the negative impact being a variation in at least one operational parameter of the set of operation parameters of the first node;
   responsive to the determination of the negative impact, further adjusting the active regulation controls by applying the plurality of alternative rules in the regulation control template; and
   verifying a validity of the further adjustment of the active regulation controls for the set of operation parameters of the first node.

14. The computer system of claim 13, the method further comprising:
   in response to determining, based on the verifying, that the adjustment of the active regulation controls is not valid for the set of operational parameters, changing one or more of the operation parameters.

15. The computer system of claim 13, wherein the first node operates as an edge node when operating in the new regulation region.

16. The computer system of claim 15, wherein the method further comprises:
   determining a change in location of the first node from the new regulation region to an updated regulation region using a real time tamper-proof location detection method.

17. The computer system of claim 16, wherein the method further comprises:
   responsive to the determining the change in location of the first node to the updated regulation region, automatically adjusting the active regulation controls of the first node.

18. The computer system of claim 13 wherein the plurality of suggested attribute values comprise:
   a location for applicable regulatory bodies;
   a definition of a plurality of policies that need to be followed by the first node; and
   controls that need to be applied to implement the plurality of policies on the first node.

\* \* \* \* \*